Oct. 31, 1950 R. A. MULLANEY 2,527,646

RECORD CHANGER TRIP MECHANISM

Filed April 23, 1945 4 Sheets-Sheet 1

INVENTOR.
Ralph A. Mullaney
BY
Frank E. Mauritz
ATTORNEY

RECORD CHANGER TRIP MECHANISM

Filed April 23, 1945 4 Sheets-Sheet 2

INVENTOR.
Ralph A. Mullaney
BY Frank E. Mauritz
ATTORNEY

INVENTOR.
Ralph A. Mullaney
BY
Frank E. Maurits
ATTORNEY

Oct. 31, 1950 R. A. MULLANEY 2,527,646

RECORD CHANGER TRIP MECHANISM

Filed April 23, 1945 4 Sheets-Sheet 4

INVENTOR.
Ralph A. Mullaney
BY
Frank E. Mauritz
ATTORNEY

Patented Oct. 31, 1950 2,527,646

UNITED STATES PATENT OFFICE 2,527,646

RECORD CHANGER TRIP MECHANISM

Ralph A. Mullaney, Elmwood Park, Ill., assignor to Zenith Radio Corporation, a corporation of Illinois Application April 23, 1945, Serial No. 589,792

5 Claims. (Cl. 274—1)

Figures 1, 2, 4A:
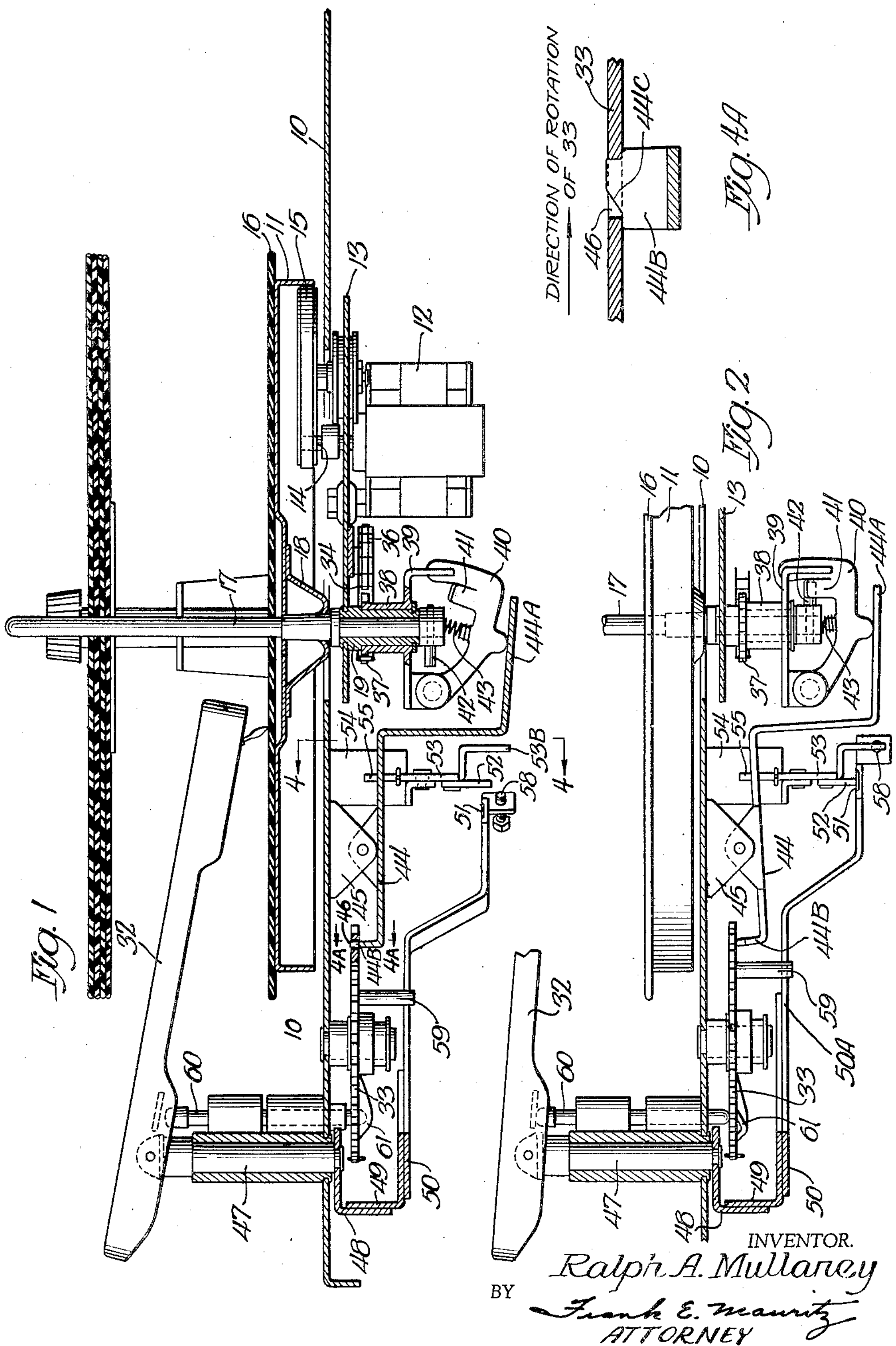

This invention relates to automatic phonographs and more particularly relates to an improved automatic record changer for phonographs.

In most conventional automatic phonographs, a single motor is provided for driving the turntable upon which rests the disc record to be reproduced and for driving the record-changing mechanism, which includes mechanism for selecting one of a stack of records and placing the selected record upon the turntable, as well as mechanism for swinging the tone arm out of the path of the selected record during its movement towards the turntable and for placing the tone arm into playing position for playing the selected record. In such phonographs, there is provided a clutch for coupling the record-changing mechanism with the motor during the record changing cycle of the phonograph operation. This clutch is usually actuated for engagement of the motor with the record changing mechanism by means of the tone arm, whereby the actuation may be initiated dependent upon the position of the tone arm, the speed of motion of the tone arm, or the direction of motion of the tone arm, as is well known in the art.

In the usual operation of an automatic phonograph, the phonograph is loaded with a stack of records, while no record is on the turntable. For the purpose of initiating the operation of the phonograph there is provided a button which, when operated, initiates a record changing cycle by actuating the clutch for engaging the motor with the record changing mechanism. A record is then selected from the stack and placed on the turntable, and the tone arm is swung into playing position.

During the operation of the phonograph it sometimes is not desired to reproduce fully a selected record which is being played, and therefore conventional phonographs are provided with a reject button. When this button is operated, a record changing cycle is initiated independently of the position of the tone arm and in the midst of the reproduction of a record.

In some phonographs two separate buttons or equivalent members are provided for starting and rejecting, while in others the same button is used for both purposes.

Naturally, a proper mechanism must be provided and actuated by the button or buttons, for actuating the clutch for engagement of the motor with the record changing mechanism. These buttons are usually located in the plane of the base plate of the record changer and are therefore in poorly illuminated and inconvenient spots in most conventional phonographs. Since phonographs are mostly operated by persons unfamiliar with the mechanics thereof, it is desirable to reduce the number of necessary controls to a minimum and to place the essential controls in readily accessible and clearly visible locations.

The object of the present invention, therefore, is to provide a new and improved record changing mechanism in which the number of essential controls is reduced to a minimum and wherein these controls may be placed in accessible and clearly visible locations.

Another object of the present invention is to provide a record changing mechanism which is of simpler construction than those hitherto known, while performing all the necessary functions of known mechanisms.

In accordance with the present invention there is provided in an automatic record changer including a rotatable turntable and a motor, the combination of a mechanism adapted to be driven by the motor for successively transferring successive ones of a plurality of records into playing position on the turntable during successive record changing cycles, and means actuated by movement of the mechanism for establishing a driving connection between the motor and the mechanism thereby to initiate one of the record changing cycles.

For a better understanding of the invention, together with other and further objects thereof, reference is had to the following description taken in connection with the accompanying drawings, and its scope will be pointed out in the appended claims.

Figure 3:
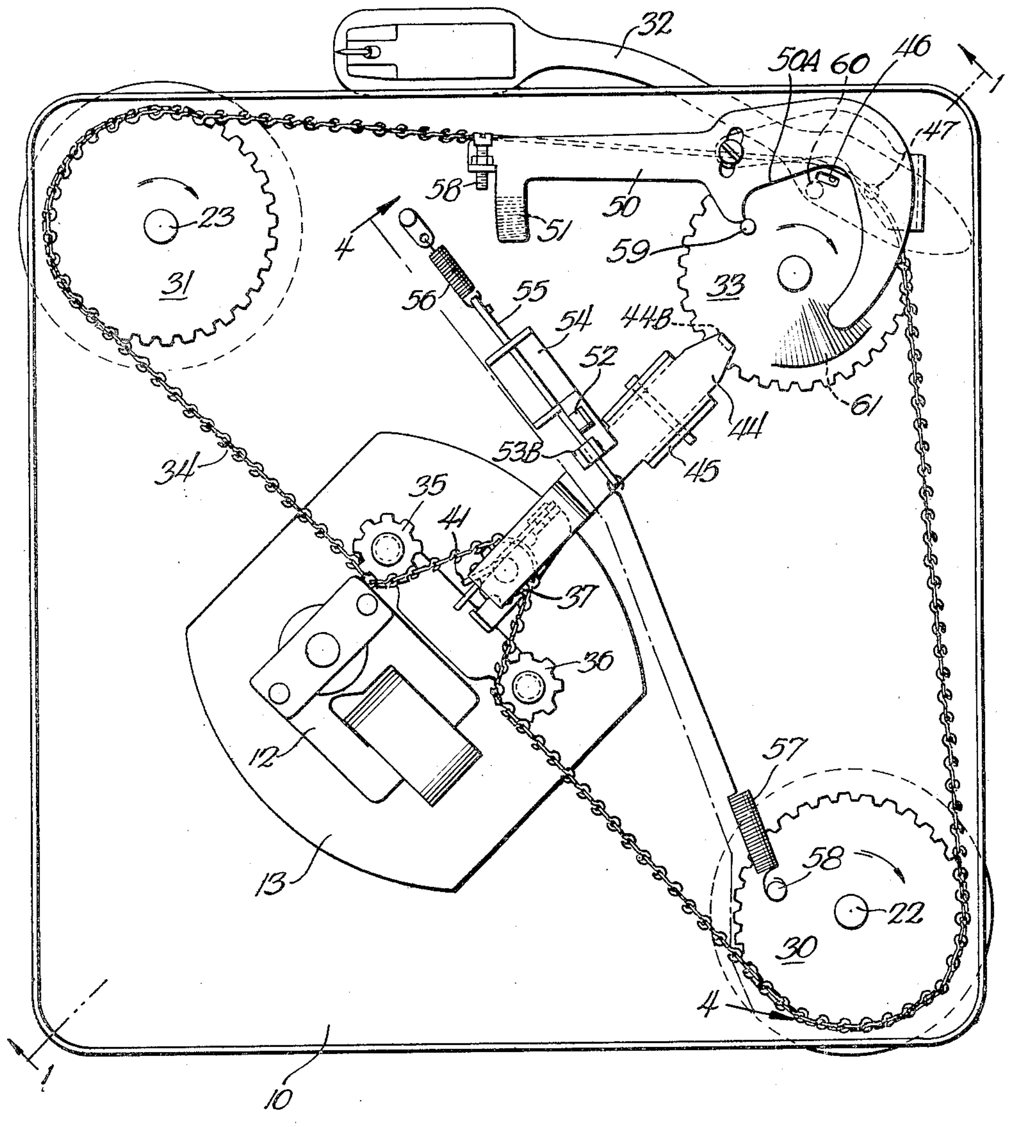
Figure 4:
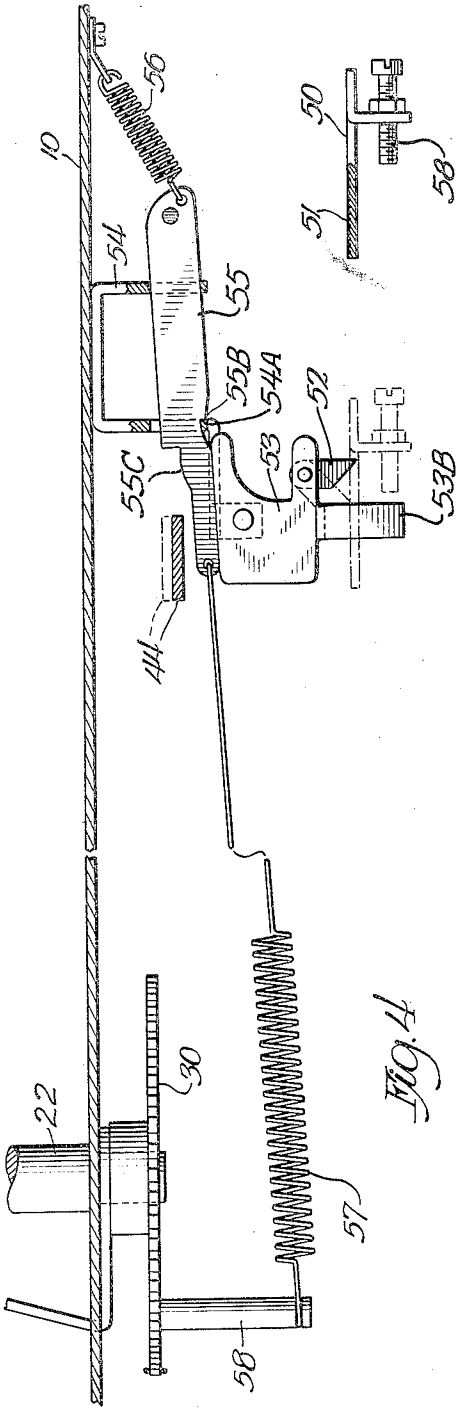
Figure 5:
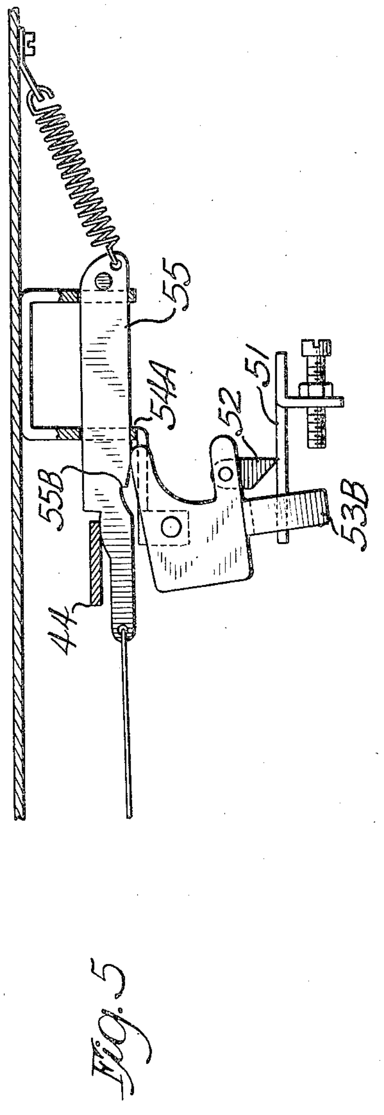
Figure 6:
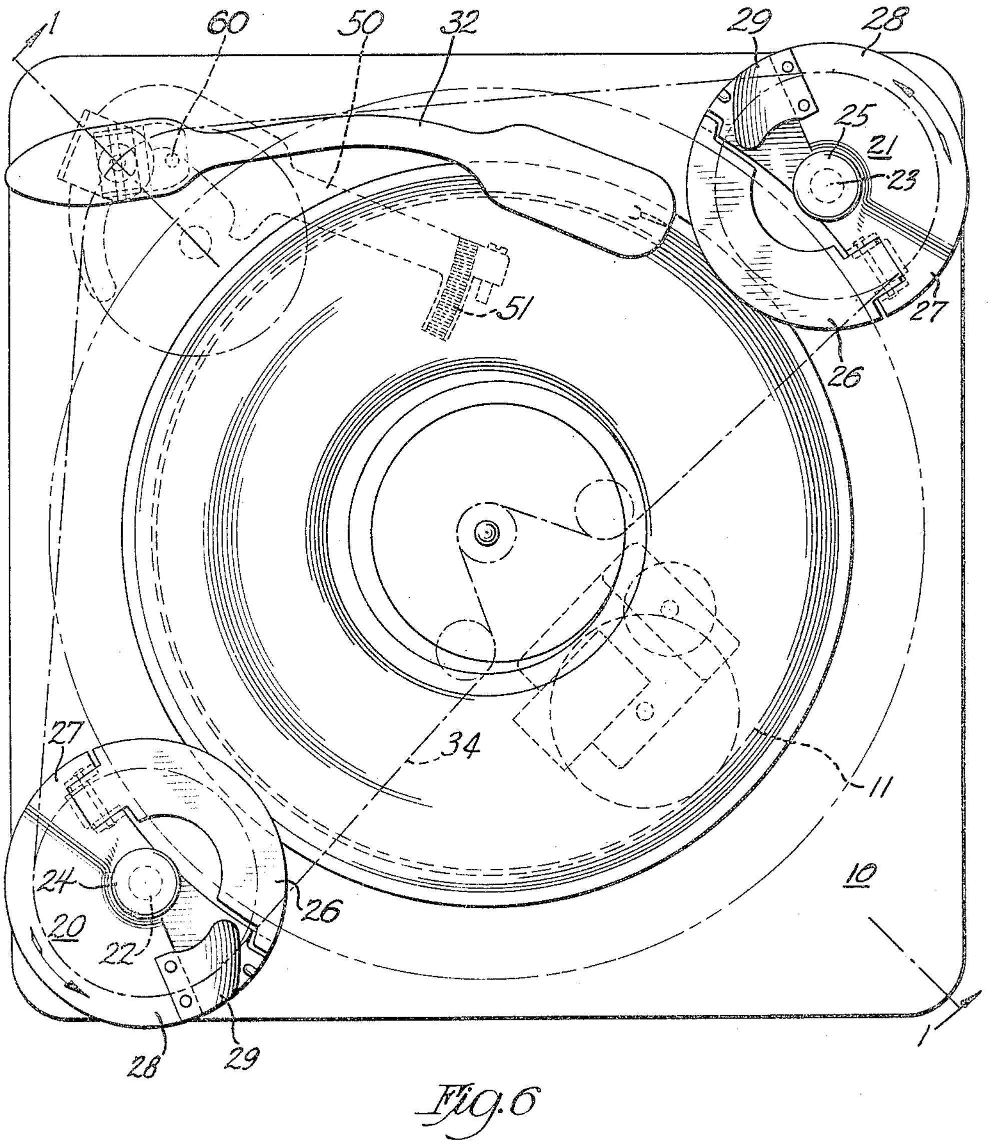

In the accompanying drawings, Fig. 1 is a sectional view taken substantially on line 1—1 of Fig. 3 corresponding to line 1—1 of Fig. 6 and shows a portion of the record changing mechanism of the present invention in non-operating condition during the record playing cycle of the phonograph operation, while Fig. 2 shows essentially the same view of the same parts shown in Fig. 1 in operating position for effecting the record changing cycle. Fig. 3 shows a view looking upward into the record changing mechanism mounted on the bottom of the base plate of the record changer shown in Fig. 6 in one position thereof during the record changing cycle; Fig. 4 is a view taken substantially on line 4—4 of Fig. 1, corresponding to line 4—4 of Fig. 3, showing certain parts of the clutch actuating mechanism; Fig. 4A shows a sectional view taken substantially on line 4A—4A of Fig. 1; Fig. 5 shows a fragmentary view of the same mechanism shown in Fig. 4 but in a position during the record changing cycle; and Fig. 6 shows a top view of the base plate of the record changer with turntable, tone arm, and record supporting and selecting discs. In these figures the same members are indicated by the same reference numerals.

Referring now more particularly to Figs. 1 and 3 of the drawings, there is shown a base plate 10 upon which the record changer mechanism is mounted. For playing records there is provided a turntable 11 driven by a motor 12 mounted on a mounting plate 13 carried by the base plate 10. Between the motor shaft 14 and the rim of the turntable 11 there is provided a friction wheel 15 rotatably mounted on the mounting plate 13, rotary motion of the motor being transferred to the turntable through the friction wheel 15.

For centering record 16 on the turntable there is provided a rotatable spindle 17 adapted to be driven by the turntable 11 through the friction coupling provided by the slightly resilient member 18 bearing on the turntable 11 in conventional manner. The spindle 17 is guided by means of a guide sleeve 19 secured at one end to the mounting plate 13.

The record changing mechanism includes a pair of rotatable record supporting and selecting discs 20 and 21, shown in Fig. 6, located in elevated positions with respect to the turntable 11 and attached for rotatable movement to shafts 22 and 23, respectively, carrying knurled knobs 24 and 25 for manual operation at their ends above the base plate 10. These discs and particular features thereof are described and claimed in co-pending application S. N. 589,791, now abandoned, by the present applicant entitled Record Feeding Mechanism, filed on the same date as the present application and assigned to the same assignee. Each of these discs possesses a lower segmentary section 26, an inclined segmentary section 27, a higher segmentary section 28, and a tongue member 29. It is understood, however, that any other type of rotatable record selecting device adapted to select a record from a stack when rotated in one direction is deemed a full equivalent of the discs shown and described herein, merely by way of example and that the record selecting device may take other forms and shapes.

Referring to Fig. 3 of the drawings there are shown the bottom ends of rotatable disc shafts 22 and 23 to each of which a sprocket wheel 30 and 31, respectively, is fixedly attached. For vertical and horizontal movement of a tone arm 32 there is provided a sprocket cam wheel 33. For rotating the sprocket wheels 30, 31, and 33 in synchronism there is provided an endless chain 34 which also engages with a pair of idlers 35 and 36, adjustably mounted for rotatable movement on the mounting plate 13, and which also engages with a driving sprocket wheel 37.

Referring to Fig. 1, in which the connected sprocket wheels 30 and 31 are not shown for the sake of simplicity, it is seen that the driving sprocket wheel 37 is a portion of a separate rotatable driving member 38, surrounding and guided by the fixedly mounted guide sleeve 19 and held in position for rotatable movement with respect thereto as shown. The driving member 38 normally stationary during the record playing cycle is provided with a lever portion 39.

For the purpose of driving endless chain 34 and thus providing a driving connection between the record changing mechanism including sprocket wheels 30, 31 and 33, and chain driving sprocket wheel 37, and the motor 12, and more specifically, to provide a driving connection between the spindle 17 and the sprocket wheel portion 37 of driving member 38 there is provided a clutch comprising a clutch lever 40 pivotally attached to driving member 38, and having an extension 41. The lower end of the spindle 17 carries in a radial bore a pin 42 which is fixedly attached to the spindle and adapted to become engaged with extension 41 of the clutch lever 40 when the same is pivoted upwards, thereby to establish a driving connection between the spindle 17 and the driving sprocket wheel 37. In order to maintain the clutch in disengagement during the record playing cycle of the phonograph there is provided a small coil spring 43 with one of its ends secured on an extension of the clutch lever 40 and its other end pressing against the bottom end of the spindle 17, as shown. In this position the pin 42 rotates freely and does not engage with extension 41 of the clutch lever 40 during reproduction of the record.

For bringing the extension 41 of the clutch lever 40 into engagement with the pin 42 against the pressure of the coil spring 43 there is provided a clutch actuating lever 44 which is pivotally supported by a supporting bracket 45 mounted on the bottom of base plate 10 as shown. For arresting the motion of the record changing mechanism at the end of a record changing cycle and during the record playing cycle the lever 44 is provided with an extension 44B which is adapted to come into engagement under pressure of the coil spring 43, with an opening 46 (Fig. 4A) in the sprocket cam wheel 33, which opening is of elongated rectangular shape with its short side extending radially on the sprocket cam wheel 33 as shown in Fig. 4A.

For actuating the clutch at the end of each record playing cycle and thereby to initiate a record changing cycle the tone arm 32 is pivotally hinged to a rotatably mounted shaft 47, to the other end of which an L-shaped member 48 is fixedly attached. By means of a second L-shaped member 49 the cam and ratchet lever 50 is attached to the member 48, so that a rigid connection exists between the tone arm 32 and the ratchet lever 50. This lever 50, which is also shown in Figs. 3 and 6, is provided at its free end with a ratchet portion 51 comprising a series of saw-tooth shaped embossments or indentations as is conventional.

Referring now to Fig. 4 of the drawings, showing a cross section through Fig. 1 taken substantially along the line 4—4, there is shown a pivotally mounted pawl 52 adapted to cooperate with the ratchet portion 51 of lever 50, pawl 52 being pivotally hinged to a trigger member 53 which in turn is pivotally hinged to a supporting bracket 54, which is fixedly attached to the bottom side of the base plate 10. For releasing the record changing mechanism and actuating the clutch by means of the clutch actuating lever 44 or, more specifically, for disengaging the extension 44B of lever 44 from a locking engagement with the opening 46 in sprocket wheel 33 and for bringing the clutch projection 41 into engagement with pin 42 against the pressure of the coil spring 43 of Fig. 1, there is provided a release lever 55 guided in two guide openings in the supporting bracket 54 as shown in Fig. 4 and held under tension by a relatively weak coil spring 56 attached between one end of release lever 55 and the bottom of the base plate 10 and by a second relatively strong coil spring 57 attached between the other end of release lever 55 and a post 58 eccentrically mounted on the sprocket cam wheel 33. For maintaining the release lever 55 in the non-operating position during the record playing cycle this lever is provided with an edge 55B, which is held under pressure by the coil spring 57 against an adjacent abutment on the supporting bracket 54 in Fig. 4. This abutment on bracket 54 acts as a stop member for the release lever 55. In the record changing operating condition the release lever 55 assumes the position indicated in Fig. 5 and engages with and raises one end of the lever 44 at the cam surface 55C to the position indicated by dotted lines in Fig. 4. Upward movement of lever 44 to the dotted position causes engagement of pin 42 with extension 41 and starts the record changing cycle.

While the pawl and ratchet arrangement 51, 52 is a so called tripping or releasing device for the record changing mechanism and depends for its operation on the direction of motion of the tone arm, as is well known in the art, the lever 50 is provided also with an extension carrying a screw 58, the end of which is engageable with an extension 53B of the trigger member 53 for raising lever 55 over the abutment on bracket 54 to provide a tripping mechanism which depends solely on the position of the tone arm, as is likewise well known in the art. Hence the record changing mechanism can be released either by a change in the direction of motion of the tone arm due to an eccentric tripping groove on the record or by arrival of the tone arm at a predetermined position on the record. It is understood, however, that the particular type of releasing device used is immaterial to the present invention.

In the foregoing the features of the invention have been described permitting release of the record changing mechanism according to direction of movement or position of the tone arm. Since it is also desired to initiate a record changing cycle independently of the tone arm movement or position the end 44B of the actuating lever 44, which is engageable with the opening 46 in sprocket cam wheel 33, is provided with a slanting edge 44C as shown in Fig. 4A. The amount by which the edge 44C slants is so chosen that a movement of wheel 33 in the direction of the arrow produces a downward motion of the lever end 44B until it finally becomes totally disengaged from its locking engagement with the opening 46 and rests against the lower surface of the wheel disc 33 whereby the record changing mechanism is released and the clutch actuated by the other end of the actuating lever 44.

For controlling the horizontal motion of the tone arm 32 during the record changing cycle the cam and ratchet lever 50 is provided with a cam portion 50A, best visible in Fig. 3, which is engageable with a post 59 eccentrically mounted on sprocket wheel 33. For vertical motion of the tone arm 32 the latter is coupled to a longitudinally movable rod 60 (Fig. 1) which normally rests, due to gravity forces acting thereon, in a depression 61 of the cam and sprocket wheel 33 out of contact with the tone arm during the record playing cycle and rides on the upper surface thereof during the record changing cycle, thereby to raise the tone arm above the plane of the record. Additional features can be incorporated to enable the phonograph automatically to play intermixed records having diameters of 10 and 12 inches respectively. Reference is made to my copending application, Serial Number 589,781, now abandoned, filed concurrently herewith in which such an arrangement for playing intermixed 10'' and 12'' records is described. It is apparent that the arrangement described therein may be applied to the record changer described herein.

The operation of the apparatus described is now explained. Referring first to Fig. 1 of the drawings, which shows the record changing mechanism in non-operating condition, the motor 12 drives the turntable 11 by way of motor shaft 14 and friction wheel 15. The record 16 on the turntable and the spindle 17 with its pin 42 rotate in the direction indicated whereby the tone arm 32 follows the playing groove of the record by coaction therewith of its stylus or needle. The pin 42 (Fig. 1) rotates freely since the extension 41 of clutch lever 40 is held out of its path by means of the compression spring 43. The clutch actuating lever 44 is in the position shown with its end 44B engaged in the opening 46 of the wheel 33 for arresting the record changing mechanism. The record supporting and selecting discs 20 and 21 are in the positions shown in Figs. 1 and 6. Pawl 52 hangs freely from the trigger member 53 while the ratchet lever 50 is remote therefrom in the position indicated in Figs. 1 and 4 and gradually approaches the pawl as the tone arm nears the center of the record. The post 58 on sprocket wheel 30 is in its extreme position so that the spring 57 hold the release member 55 in the position indicated in Fig. 4 under maximum tension with its edge 55B pressing the adjacent abutment 54A on the supporting bracket 54.

The tone arm raising rod 60 rests by gravity forces acting thereon in the depression 61 of wheel 33, and the post 59 is out of engagement with the cam portion 50A of lever 50.

As the tone arm 32 approaches the center of the record and is close to entering the tripping groove thereon the free end of lever 50 with the ratchet portion 51 and the pawl 52 assume the positions indicated in Fig. 5. While the ratchet portion travels from right to left in Figs. 4 and 5 the pawl 52 idles over the same. However, when the tone arm stylus travels in the eccentric tripping groove on the record, lever 50 suffers a reversal of direction of its movement and the ratchet portion 51 moves from left to right thereby positively engaging the pawl 52 and rotating the trigger member 53 counterclockwise about its pivot point in Figs. 4 and 5. Such rotation of member 53 causes raising of the release lever 55, freeing its edge 55B from the supporting bracket 54 and the force of the spring 57 pulls the release lever 55 from right to left and upwards. Lever 55 then engages the actuating lever 44 at the cam surface 55C and raises the latter, thereby disengaging its end 44B from the opening 46 in the wheel 33 shown in Fig. 1, to free the record changing mechanism and at the same time to raise the other end 44A of actuating lever 44 against the pressure of spring 43 of Fig. 1 to move extension 41 into the path of rotating pin 42 whereby a driving connection is established between the motor 12 and driving sprocket wheel 37 which drives sprocket wheels 30, 31 and 33 by means of the chain 34 as shown in Fig. 3. The record changing mechanism in operating condition during a changing cycle is shown in Fig. 2.

The release of release lever 55 in Fig. 4 may also be effected by means of the screw 58 which when near the extreme end of its travel causes rotation of the trigger member 53 in clockwise direction to release the release lever 55. The ensuing operation is the same as described above.

Referring now to Figs. 2 and 3, the tone arm 32 is raised by means of rod 60 when wheel 33 is rotated and it is moved outwardly by means of the post 59 coacting with the cam portion 50A of lever 50. Discs 20 and 21 are rotated in the direction indicated whereby their tongue portions 29 are inserted into the stack of records in such manner that the bottommost record is segregated therefrom and, after continued rotation of the discs, released to drop by its own weight upon the turntable or, upon a played record or records already thereon. The remainder of the record stack is supported by portions 28 of the discs and then lowered by the inclined portions 27 until they are again supported by portions 26 after a complete revolution of the discs as explained more fully in my above mentioned application, Serial Number 589,791, filed concurrently herewith.

Meanwhile the end 44B of the clutch actuating lever 44 rides on the lower surface of wheel 33, thereby maintaining the clutch in engagement during the record changing cycle. In Fig. 3 the sprocket wheels 30, 31 and 33 are driven to rotate clockwise (since the bottom of base plate 10 is now viewed) and the post 58 eccentrically mounted on the wheel 30 moves inwardly thereby releasing the tension on the spring 57 until the tension of the spring 56, which is normally weaker than that of spring 57, becomes predominant and pulls the release lever 55 from left to right as shown in Fig. 4 and into its original position where its edge portion 55B again engages with the adjacent abutment 54A of the supporting bracket 54. During further rotation of wheel 30 the post 58 moves outwardly again until it reassumes its extreme position at the end of a complete revolution wherein the coil spring 57 is under maximum tension.

After a complete revolution of the wheel 33 the end 44B of clutch actuating lever 44 drops into engagement with the opening 46 of wheel 33 due to the force exerted on the lever by the compressed coil spring 43. The clutch member 40 drops and its extension 41 moves out of engagement with the pin 42, thus interrupting the driving connection between the motor 12 and the record changing mechanism. This terminates the record changing cycle during which the record supporting and selecting discs 20 and 21 and the sprocket wheels 30, 31 and 33 each have completed one full revolution. At the end of cycle the tone arm 32 is brought into proper playing position by coaction of pin 59 with the cam surface 59A and a new record playing cycle begins.

While in the foregoing description the record changing cycle was initiated by the tone arm, the operation of the apparatus is now described for initiating a record changing cycle regardless of the position or movement of the tone arm. If it is desired to reject a record which is being played or to place the first record on the turntable, one of the knurled knobs 24 or 25 of Fig. 6 is rotated counterclockwise. Such a rotation of knobs 25 or 26 is possible in spite of the fact that end 44B of clutch actuating lever 44 extends through the opening 46 of wheel 33. This is so because it is evident from Figure 4A that rotation of wheel 33 produced by rotating knobs 22 or 23 manually causes the lever end 44B to be cammed downwardly until it rides on the lower surface of wheel 33. The downward movement of the lever end 44B simultaneously causes the other end of clutch actuating lever 44 to move upwardly and thereby to cause engagement between clutch elements 41 and 42 to initiate a record changing cycle in the manner described above.

Starting of an automatic phonograph employing the described mechanism is also effected in the same manner as just described. The automatic record changer is loaded with a stack of records which are normally supported by the supporting sections 26 of the record supporting discs 20 and 21 of Fig. 6 wherein the record changing mechanism is disengaged. In order to start operation, one of the knobs 24 or 25 is rotated counterclockwise through a relatively small angle sufficient to free the record changing mechanism and to establish the driving connection between the latter and the motor in the same manner as described above for the case of rejecting a record. The discs 20 and 21 execute a complete revolution during which the tongue members 29 of the discs segregate the bottommost record from the stack and release the same to fall by its own weight upon the turntable whereupon the first record playing cycle begins.

From the foregoing description it will be apparent that there has been provided a new and improved record changing mechanism of extremely simple and efficient construction which requires no separate mechanism for starting its operation or rejecting records, but in which a small movement of the record changing mechanism itself suffices to bring about a driving connection between the latter and its driving motor.

While the present embodiment shows a single motor for driving both the record turntable and the record changing mechanism, it is understood that a separate motor can equally well be provided for the changing mechanism, in which case the clutch is arranged between the mechanism and the separate motor, as will be readily seen by those skilled in the art.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A mechanical trip mechanism for a record changer including a single-revolution element rotatable about an axis, a driving element, and a cam-operated clutch for completing a driving connection between said elements, comprising: a release member movable in a direction substantially normal to said axis from a first position to a second position, including a cam surface for operating said clutch during movement thereof, and including a stop recess; a lock member having a stop abutment engaging said recess normally to lock said release member in said first position; a first spring connected between said release member and an eccentrically disposed portion of said single-revolution element and biasing said release member for movement toward said second position; means for releasing said recess from said stop abutment to permit movement of said release member to said second position; and a second spring, having a modulus of elasticity less than that of said first spring, connected to said release member and biasing said member to said first position, thereby to restore said member to said first position after a predetermined rotation of said single-revolution member.

2. A mechanical trip mechanism for a record changer including a single-revolution element rotatable about an axis, a driving element, and a cam-operated clutch for completing a driving connection between said elements, comprising: a guide member positioned adjacent said single-revolution element and including an opening extending in a direction substantially normal to said axis; a release member supported in said opening of said guide member for movement in the direction of said opening from a first position to a second position, including a cam surface for operating said clutch during movement thereof, and including a stop recess; a lock member having a stop abutment engaging said recess normally to lock said release member in said first position; a first spring connected between said release member and an eccentrically disposed portion of said single-revolution element and biasing said release member for movement toward said second position; means for releasing said recess from said stop abutment to permit movement of said release member to said second position; and a second spring, having a modulus of elasticity less than that of said first spring, connected to said release member and biasing said member to said first position, thereby to restore said member to said first position after a predetermined rotation of said single-revolution member.

3. A mechanical trip mechanism for a record changer including a single-revolution element rotatable about an axis, a driving element, and a cam-operated clutch for completing a driving connection between said elements, comprising: a guide member positioned adjacent said single-revolution element and including an opening extending in a direction substantially normal to said axis; a release member supported in said opening of said guide member for movement in the direction of said opening from a first position to a second position, including a cam surface for operating said clutch during movement thereof, and including a stop recess; a lock member having a stop abutment, supported on said guide member, engaging said recess normally to lock said release member in said first position; a first spring connected between said release member and an eccentrically disposed portion of said single-revolution element and biasing said release member for movement toward said second position; means for releasing said recess from said stop abutment to permit movement of said release member to said second position; and a second spring, having a modulus of elasticity less than that of said first spring, connected to said release member and biasing said member to said first position, thereby to restore said member to said first position after a predetermined rotation of said single-revolution member.

4. A mechanical trip mechanism for a record changer including a single-revolution element rotatable about an axis, a driving element, and a cam-operated clutch for completing a driving connection between said elements, comprising: an elongated release member supported lengthwise along a line substantially normal to said axis for movement along said line from a first position to a second position, including a cam surface for operating said clutch during movement thereof, and including a stop recess; a lock member having a stop abutment engaging said recess normally to lock said release member in said first position; a first spring connected between one end of said release member and an eccentrically disposed portion of said single-revolution element and biasing said release member for movement toward said second position; means for releasing said recess from said stop abutment to permit movement of said release member to said second position; and a second spring, having a modulus of elasticity less than that of said first spring, connected to the other end of said release member and biasing said member to said first position, thereby to restore said member to said first position after a predetermined rotation of said single-revolution member.

5. A mechanical trip mechanism for a record changer including a single-revolution element rotatable about an axis, a driving element, and a cam-operated clutch for completing a driving connection between said elements, comprising: a release member movable in a direction substantially normal to said axis from a first position to a second position, including a cam surface for operating said clutch during movement thereof, and including a stop recess; a lock member having a stop abutment engaging said recess normally to lock said release member in said first position; a pin eccentrically positioned on said single-revolution element; a first spring connected between said release member and said pin and biasing said release member for movement toward said second position; means for releasing said recess from said stop abutment to permit movement of said release member to said second position; and a second spring, having a modulus of elasticity less than that of said first spring, connected to said release member and biasing said member to said first position, thereby to restore said member to said first position after a predetermined rotation of said single-revolution member.

RALPH A. MULLANEY.

REFERENCES CITED

The following references are of record in the file of this patent:

UNITED STATES PATENTS

| Number | Name | Date |
|---|---|---|
| 1,841,593 | Benjamin | Jan. 19, 1932 |
| 1,931,487 | Collison et al. | Oct. 24, 1933 |
| 2,031,449 | Arvidius | Feb. 18, 1936 |
| 2,287,560 | Osborne et al. | June 23, 1942 |
| 2,313,193 | Delchef | Mar. 9, 1943 |
| 2,339,981 | Cranmer et al. | Jan. 25, 1944 |

FOREIGN PATENTS

| Number | Country | Date |
|---|---|---|
| 394,326 | Great Britain | June 14, 1933 |